June 2, 1959 W. J. SCHMIDT ET AL 2,889,494
METER CIRCUIT PROTECTIVE MEANS
Filed March 19, 1954 3 Sheets-Sheet 1
Fig.1.
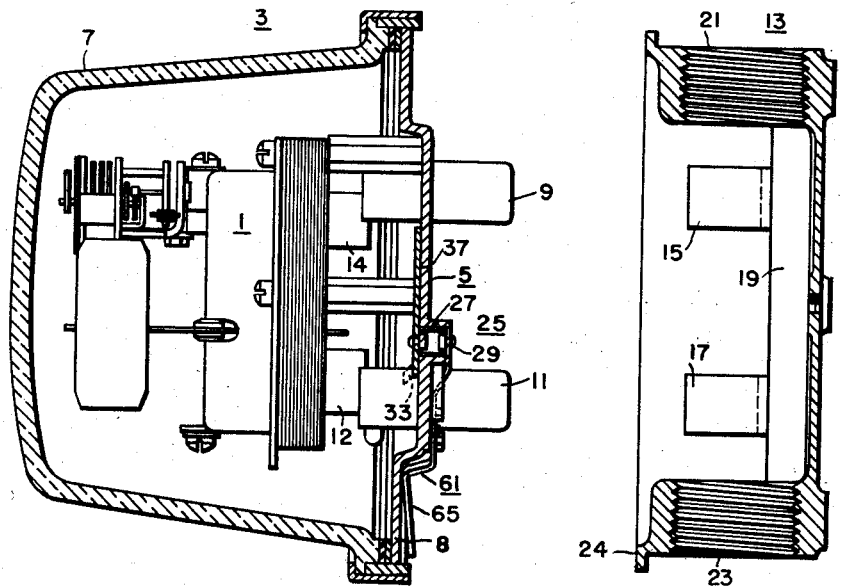
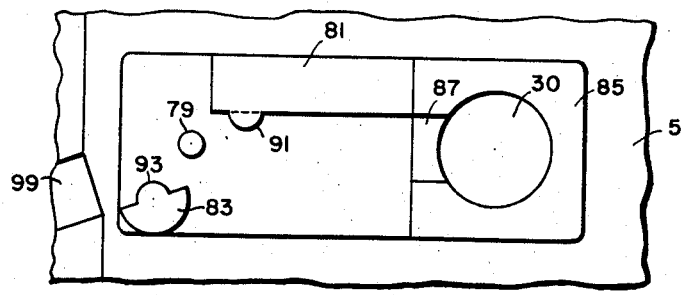
Fig. 2.
Fig. 3.
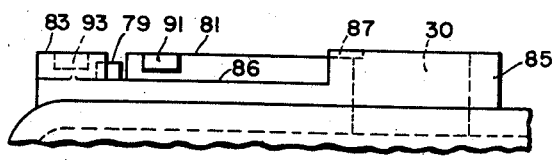
WITNESSES
Edwin E. Bassler
David M. Schiller
INVENTORS
Warren J. Schmidt &
Walter Axman
BY C. J. Friedman
ATTORNEY June 2, 1959  W. J. SCHMIDT ET AL  2,889,494
METER CIRCUIT PROTECTIVE MEANS
Filed March 19, 1954  3 Sheets-Sheet 3

United States Patent Office 2,889,494
Patented June 2, 1959

2,889,494

METER CIRCUIT PROTECTIVE MEANS

Warren J. Schmidt, Bloomfield, and Walter Axman, Stirling, N.J., assignors to Westinghouse Electric Corporation, East Pittsburgh, Pa., a corporation of Pennsylvania Application March 19, 1954, Serial No. 417,336

6 Claims. (Cl. 317—108)

This invention relates to meter circuit protective means and has particular relation to electrical discharge devices for use in alternating-current watt-hour meters for protecting such meters against electrical surges.

A discussion of electrical discharge devices for protecting watthour meters is presented in United States Patent No. 2,199,630, assigned to Westinghouse Electric Corporation. As disclosed in the patent, one or more discharge devices conveniently may be associated with an alternating-current watthour meter of the detachable type including a cover receptacle comprising a suitable cover attached to a base plate and a cooperating socket receptacle.

As described in the above-mentioned patent, the discharge device is in the form of a pair of electrodes spaced to define a discharge gap which breaks down when the voltage applied thereto rises above a predetermined value. One electrode is connected to the windings of the meter and the other electrode may engage a portion of the meter structure to provide a ground connection.

For certain meter installations, inspection or replacement of the cooperating electrodes of the associated discharge devices may be desirable. In the past, a number of difficulties have been encountered in connection with the assembly and disassembly of electrodes relative to the associated meter structure. For example, with a previous arrangement it has been necessary to remove the protective cover which surrounds the operating parts of the meter in order to permit detachment of the electrodes. This operation is time consuming and, in addition, may result in alteration of the operating characteristics of the meter.

In accordance with the invention, a discharge device is provided for protecting an electroresponsive meter against electrical surges which includes at least one accessible electrode constructed and assembled relative to the associated meter structure so as to permit ready installation and removal thereof for the purpose of inspection or repair without the necessity of removing the protective cover which surrounds the operating parts of the meter. Preferably, an electrode subject to appreciable wear should be of such accessible construction.

According to a specific embodiment of the invention, a discharge device is associated with an alternating-current watthour meter of the detachable type including a socket receptacle adapted to detachably receive a cover receptacle comprising a suitable cover attached to a base plate to surround the meter unit which is supported by the base plate.

The discharge device includes an electroconductive terminal strip of resilient construction carrying an electrode which cooperates with an additional electrode connected to the meter windings to define a discharge gap for electrical surges. The electrodes are preferably positioned to define a discharge gap which is located externally of the cover. Conveniently, the electrodes are carried by the base plate to provide a discharge gap which is surrounded by the base plate.

The resilient terminal strip is conveniently located exteriorly of the cover and is secured to the base plate in a tensioned or flexed condition by means of suitable projections of the base plate and by means of the meter socket receptacle when the cover and socket receptacles of the meter are in an attached position. With such arrangement, the terminal strip and associated electrode may be readily installed and removed relative to the meter stucture by simple manipulation thereof when the cover and socket receptacles have been detached from each other without the necessity of disengaging the cover and base plate of the cover receptacle.

In addition, engagement of the socket receptacle and the electroconductive strip provide a convenient discharge path to ground for electrical surges which includes the socket receptacle, thereby permitting the employment of an insulating base plate.

It is, therefore, an object of the invention to provide an improved electroresponsive device.

It is another object of the invention to provide improved means for protecting electrical meter installations against electrical surges.

It is a further object of the invention to provide a discharge device for protecting an alternating-current watthour meter against electrical surges including an electrode which is constructed and assembled relative to the meter structure to facilitate the installation and removal thereof.

It is another object of the invention to provide a meter of the detachable type including a cover receptacle comprising a base plate supporting a meter unit with a cover secured to the base plate to surround the meter unit and a cooperating socket receptacle with the meter having a protective discharge device associated therewith including a pair of electrodes carried by the base plate to define a discharge gap which is positioned externally of the cover.

It is a still further object of the invention to provide a watthour meter of the detachable type including a cover receptacle comprising a cover secured to a base plate and a cooperating socket receptacle with the meter having a protective discharge device associated therewith including a deformable terminal strip resiliently secured to the base plate externally of the cover to permit installation and removal thereof by simple deformation and manipulation of the strip when the cover and socket receptacles are detached from each other without the necessity of removing the cover from the base plate and exposing the operating parts of the meter.

It is still another object of the invention to provide a meter as defined in the preceding paragraph wherein the socket receptacle engages the terminal strip when the cover and socket receptacles are in the attached position to provide a discharge path to ground for electrical surges which includes the socket receptacle.

Other objects of the invention will become apparent from the following detailed description taken in conjunction with the accompanying drawings, in which:

Figure 1 is an exploded view with parts shown in section of cooperating cover and socket receptacles of a meter embodying the invention;

Fig. 2 is a plan view of a portion of the base plate of the meter of Fig. 1;

Fig. 3 is a view in side elevation of the portion of the base plate of Fig. 2;

Figure 4:
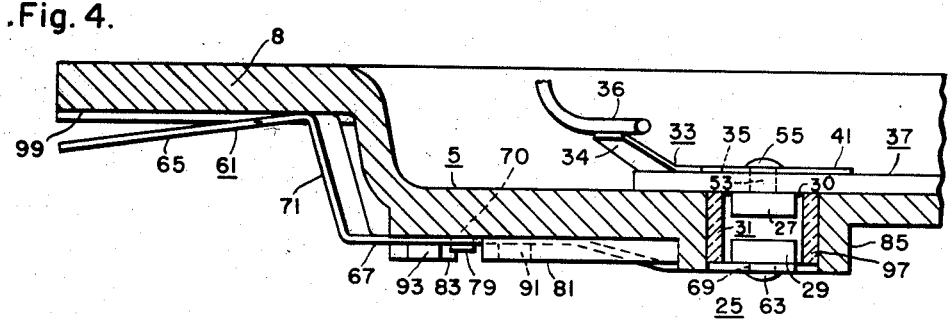
Fig. 4 is an enlarged view in section of a portion of the base plate showing a terminal strip of an associated discharge device in an operative position.

Referring to the drawings, there is illustrated in Fig. 1 an electroresponsive device, such as an alternating-current watthour meter, embodying the teachings of applicants' invention.

The meter is illustrated as being of the detachable type and includes a meter unit 1 mounted in a suitable cover receptacle 3. The receptacle 3 comprises a base plate 5 which is adapted to support the meter unit 1 and which is secured in any suitable manner to a transparent protective cover 7 which surrounds the meter unit 1. The base plate 5 is provided with a flange 8 and carries a plurality of contact blades 9 and 11 which are connected to the current windings 12 and voltage windings 14 of the meter unit 1.

A suitable socket receptacle 13 is provided which is adapted ot receive the cover receptacle 3 and which has contact jaws 15 and 17 mounted on a block of insulation 19 for engaging the contact blades 9 and 11 of the cover receptacle 3. The contact jaws 15 and 17 are connected to line and load conductors of a power circuit (not shown) which enter the socket receptacle 13 through suitable openings 21 and 23. The socket receptacle 13 is provided with a flange 24 and is preferably constructed of an electroconductive material.

When the cover and socket receptacles 3 and 13 are in the attached position, the contact blades 9 and 11 are received by the contact jaws 15 and 17 to provide electrical connections which condition the meter unit 1 for energization in accordance with power of the associated circuit (not shown). When the cover and socket receptacles are detached from each other, the contact blades 9 and 11 are disengaged from the contact jaws 15 and 17 to interrupt such electrical connections. The cover receptacle 3 and the socket receptacle 13 are conveniently joined when in the attached position as by a suitable sealing ring (not shown). Ordinarily, such socket receptacles are grounded through the conduits (not shown) which lead the line wires (not shown) into the socket receptacle. Additional details of the construction of detachable meters similar to that shown in Fig. 1 will be found in United States Patent No. 1,969,499 to Bradshaw et al.

In order to protect the meter unit 1 against electrical surges, one or more surge protectors may be associated with the meter. In the specific embodiment of Figs. 1 and 4 there is provided a single surge protector which may be in the form of an electrical discharge device represented generally by the numeral 25 and which is associated with the base plate 5 of the cover receptacle 3.

As clearly illustrated in Fig. 4, the device 25 includes a pair of electrodes 27 and 29 which may be constructed of any suitable electroconductive material. In accordance with one aspect of the invention, the base plate 5 is provided with a cavity 30 which extends entirely through the base plate and which is proportioned to accommodate the electrodes 27 and 29 in spaced relation to provide a discharge gap 31. The gap 31 is surrounded by the base plate 5 and is adapted to break down when the voltage applied thereto exceeds a predetermined value.

In order to electrically connect one of the electrodes, such as the electrode 27, to one of the meter windings, such as the voltage winding 14, a terminal strip 33 is provided. The strip 33 may be constructed of any suitable electroconductive material and is positioned within the cover receptacle 3 adjacent the meter windings. The strip 33 includes a terminal portion 34 and an additional portion 35 with the portion 34 being displaced from the plane defined by the portion 35 to facilitate the connection thereto of a lead 36 of the voltage winding 14. As will presently appear, the strip 33 is carried by a supporting member 37 which is mounted on the base plate 5 and which also serves to support the electrode 27 in an operative position within the cavity 30.

Figure 7:
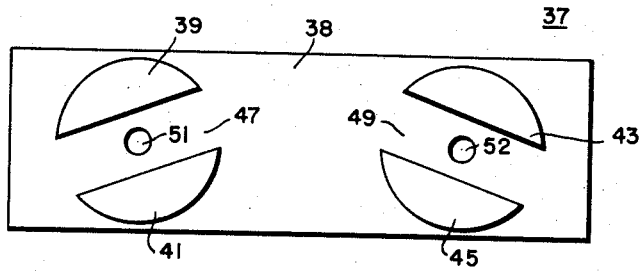
Fig. 7 is a plan view of a supporting member associated with the meter of Fig. 1.

As illustrated in Fig. 7, the supporting member 37 includes a base portion 38 having four projections 39, 41, 43, 45 extending therefrom with the projections 39 and 41 defining a channel 47 and with the projections 43 and 45 defining a channel 49. Each of the channels 47 and 49 is proportional to receive the portion 35 of the strip 33. Consequently, if it is desired to employ a pair of surge protectors for the meter, two terminal strips each similar to the strip 33 conveniently may be carried by the member 37 with each strip being associated with a separate surge protector.

The member 37 may be constructed of any suitable material and is preferably found of a heat-resistant insulating material such as a phenolic insulating material. The member 37 is conveniently formed as by molding with the projections 39, 41, 43 and 45 and a pair of openings 51 and 52 of the base 38 of the member 37 being provided during the molding operation. If the base plate is formed of a molded insulating material, the member 37 may conveniently be formed as an integral part of the base plate.

In order to secure the strip 33 and the electrode 27 to the member 37 and to provide an electrical connection between the strip 33 and the electrode 27, suitable electroconductive fastening means are provided. In the specific embodiment of Fig. 4 such fastening means is illustrated as comprising a stem 53 of the electrode 27 proportioned to be received in the opening 51 of the member 37 and an opening 54 of the terminal strip 33. In order to assemble the strip 33, the electrode 27 and the member 37, the strip 33 is positioned to have the portion 35 thereof within a selected one of the channels 47 and 49, such as the channel 47, with the openings 51 and 54 in alignment. The electrode 27 is then positioned on the opposite side of the member 33 with the stem 53 thereof projecting through the aligned openings 51 and 54. The assembly may be completed by deforming the protruding end of the stem 53 as indicated by the reference numeral 55. If the member 37 is formed separately from the base plate, the electrode 27 and the strip 33 may be secured thereto either prior or subsequent to the mounting of the member 37 on the base plate. The member 37 may be mounted on the base plate by any suitable means with the electrode 27 positioned within the cavity 30.

The member 37 is preferably proportioned to cover the associated open end of the cavity 30 when properly positioned so as to cooperate with the stem 53 of the electrode 27 to effectively isolate the surge discharge gap 31 from the meter unit 1 and the associated windings. Such arrangement ensures against damage to the meter unit and windings caused by action of discharge arcs traversing the gap 31.

In order to provide a path to ground for electrical surges means are provided in accordance with the invention for connecting the electrode 29 to a portion of the meter structure which is maintained at ground potential. As will presently appear, the electrode 29 is conveniently connected to the socket receptacle 13 for such purpose.

In order to facilitate the installation and removal of the electrode 29 relative to the meter structure, the present invention provides for the mounting of the electrode 29 externally of the cover 7 of the cover receptacle 3. Conveniently, the electrode 29 is detachably secured to the surface 86 of the base plate 5 to permit ready assembly and disassembly thereof when the cover and socket receptacles are detached from each other without the necessity of removing the cover 7 from the base plate 5.

Figure 5:
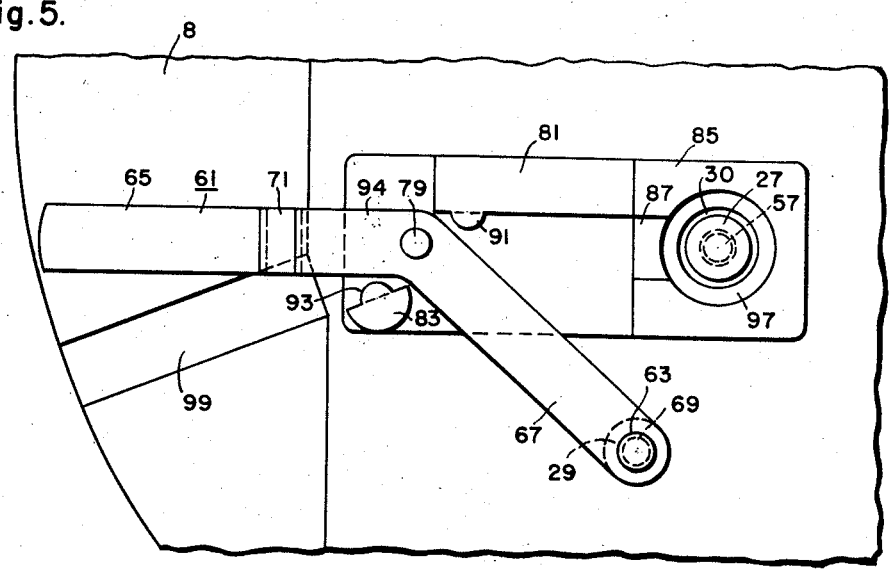
Fig. 5 is a view in bottom plan of the portion of Fig. 4 showing the terminal strip in a different position.
Figure 6:
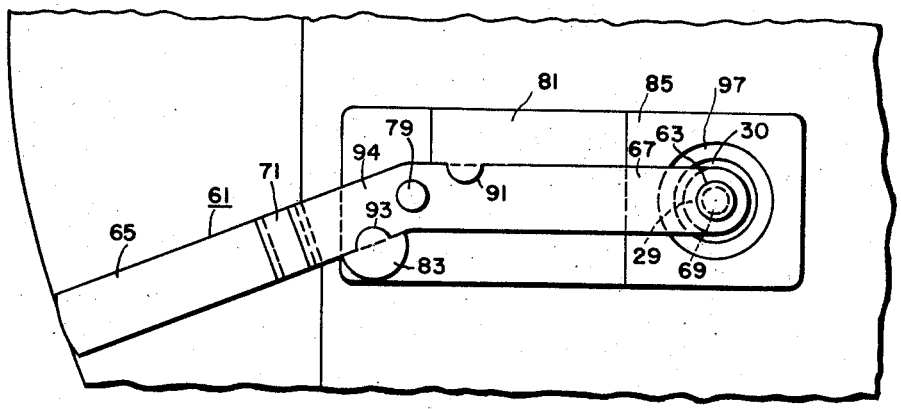
Fig. 6 is a view similar to Fig. 5 showing the terminal strip in an operative position.

In the specific embodiment of Figs. 4, 5 and 6, the electrode 29 is carried by an elongated strip 61 which may be formed of any suitable electroconductive material. Preferably, the strip 61 is constructed of a resilient and deformable electroconductive material, such as Phosphor bronze, and has ends 65 and 67 with the end 67 having an opening 69. The central portion of the strip 61 contains an opening 70. The electrode 29 may be secured to the end 67 of the strip by any suitable means. For example, the electrode 29 may have a stem 63 which is received in the opening 69 and thereupon deformed. The strip 61 also includes a portion 71 intermediate the ends 65 and 67 which extends at an angle to the ends 65 and 67. The end 67 of the strip 61 has two portions which define a pair of parallel planes which are slightly spaced from each other when the strip is in an untensioned condition. As viewed in Figs. 5 and 6, the strip 61 is substantially V-shaped with the end 67 of the strip being disposed at an angle with respect to the portions 65 and 71.

In order to facilitate inspection or replacement of the electrode 29, the strip 61 is secured to the base plate 5 externally of the cover 7 by means permitting installation and removal thereof by simple deformation and adjustment of the strip 61 when the cover and socket receptacles are detached from each other. To this end, the base plate 5 is provided with a plurality of projections 79, 81, 83 and 85 which extend from the surface 86 of the base plate and which are located externally of the cover 7.

As viewed in Fig. 4, the opening 30 of the base plate 5 extends through the base plate and terminates at the end of the projection 85. The length dimension of the projection 85 and the thickness of the base plate 5 are selected so that the opening 30 is of sufficient length to accommodate the electrodes 27 and 29 in spaced relation therein.

The projection 79 is proportioned to be received in the opening 70 of the strip 61 for the purpose of permitting proper positioning of the electrode 29 relative to the electrode 27. The projection 79 preferably has a circular cross section and is loosely received in the opening 70 of the strip 61 to serve as a pivot about which the strip 61 is rotatable for the purpose of permitting ready installation and removal of the strip relative to the base plate 5 as will presently appear.

The projection 85 may be provided with a channel 87 which is proportioned to receive the end 67 of the strip 61 when the strip is in an operative position. The projections 81 and 83 of the base plate 5 have protuberances 91 and 93, respectively, which extend therefrom in directions substantially parallel to the surface 86 of the base plate 5. As shown in Figs. 2, 5 and 6, the protuberances 91 and 93 are spaced from the surface 86 of the base plate 5 to define a pair of channels 92 of the base plate and are positioned to engage the surface 94 of the strip 61 when the strip is in an operative position. It is observed with reference to Figs. 3 and 4 that the distance of extension of the projection 85 from the surface 86 of the base plate is substantially greater than the distance by which the protuberances 91 and 93 are spaced from the surface 86.

Operations required to assemble and disassemble the electrode 29 may now be explained. In order to mount the strip 61 on the base plate 5, the strip is initially positioned as shown in Fig. 5 to have the projection 79 of the base plate extend through the opening 70 of the strip. Pressure is then applied to the strip 61 to cause portions of the strip adjacent the opening 70 thereof to engage the base plate 5 in the area adjacent the projection 79. The strip 61 is then rotated in a counterclockwise direction, as viewed in Fig. 5, about the axis defined by the projection 79 from the position shown in Fig. 5 until the end 67 of the strip is positioned within the channel 87 as shown in Fig. 6. During such rotation of the strip, the end 67 thereof must be flexed in the direction permitting passage of the end 67 over the end of the projection 85 for positioning the electrode 29 within the cavity 30. With the strip positioned as shown in Fig. 6, the protuberances 91 and 93 engage the surface 94 of the strip and the electrode 29 projects into the cavity 30 of the base plate to define with the electrode 27 the discharge gap 31.

By reason of the resilient construction of the strip, the electrode 29 may be supported for deflection in the direction of flow of discharge gases produced by the discharge arcs. With such arrangement, the electrode 29 is protected against damage which may be caused by the impact of such gases upon the electrode.

As viewed in Fig. 4, accidental displacement of the electrode 29 in the vertical direction is prevented by reason of the tight engagement between the strip and the protuberances 91 and 93 which is effected by engagement of the end 67 of the strip with the end of the projection 85. When the strip is in an operative position, portions of the end 67 thereof are displaced relative to each other in a vertical direction by a distance which is greater than the distance by which such portions are displaced when the strip is detached from the base plate with the result that the strip is secured to the base plate in a tensioned condition. The thickness of the portion of the strip which is positioned in the channels 92 is preferably selected to be substantially equal to the distance by which the protuberances 91 and 92 are spaced from the surface 86 of the base plate.

Accidental displacement of the strip 61 in directions transverse to the axis of the projection 79 is prevented by means of the tensioned condition of the strip and the side walls of the channel 87 which engage edges of the strip 61 and by means of the projection 79.

By inspection of Fig. 4, it is observed that the end 65 of the strip 61 is positioned adjacent an additional channel 99 of the base plate when the electrode 29 is in an operative position. When the cover receptacle 3 is positioned to engage the socket receptacle 13 to provide a complete meter assembly, the flange 24 of the socket receptacle 13 engages the end 65 of the strip and forces the end 65 into the channel 99 of the base plate 5. Consequently, tight engagement is effected between the strip 61 and the socket receptacle 13 to thereby provide a discharge path for electrical surges which includes the socket receptacle 13. Moreover, such arrangement further assists in preventing accidental displacement of the strip 61 and the electrode 29 during operation of the meter.

In order to detach the electrode 29 from the base plate 5 for purposes of inspection or replacement, the operations required to install the electrode 29 are reversed. That is, the cover and socket receptacles 3 and 13 are detached from each other to expose the surface 86 of the base plate. The end 67 of the strip 61 is then flexed downwardly as viewed in Fig. 4 and the strip 61 rotated in the clockwise direction as viewed in Fig. 6 until the surface 94 of the strip is out of engagement with the protuberances 91 and 93. Such position of the strip 61 is illustrated in Fig. 5. The strip may now be released from the base plate 5 by effecting disengagement of the projection 79 and the opening 70 of the strip.

The construction and arrangement of parts of the device allows the base plate 5 to be constructed of either metallic or insulating materials. Preferably, the base plate is formed of an insulating material, such as a phenolic insulation, thereby eliminating the necessity of providing insulating bushings for the contact blades 9 and 11. Conveniently, the base plate is formed by a molding operation to provide an integral structure which includes the several projections and channels of the base plate and the supporting member 37.

In order to prevent damage to portions of the base plate adjacent the cavity 30 by action of discharge arcs traversing the gap 31, a suitable barrier may be interposed between the base plate and the discharge gap. Such a barrier may conveniently take the form of a liner 97 positioned within the cavity 30 to surround the gap 31. The liner 97 may be constructed of any suitable heat-resistant material, such as porcelain, or may be constructed of a substance which evolves gas in the presence of an electrical discharge to assist in quenching such discharges.

Figure 8:
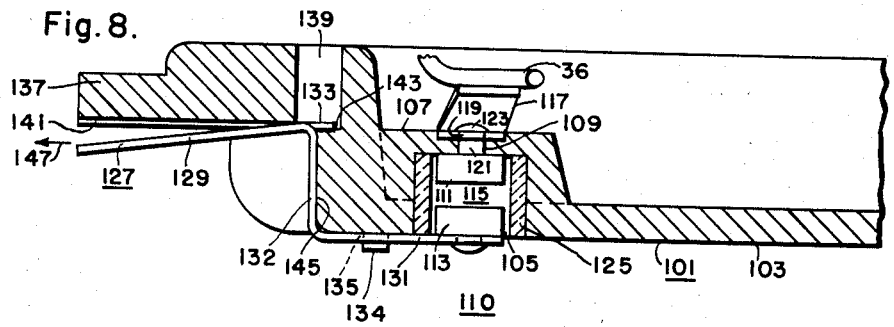
Fig. 8 is a view similar to Fig. 4 showing different constructions for portions of Fig. 4.
Figure 9:
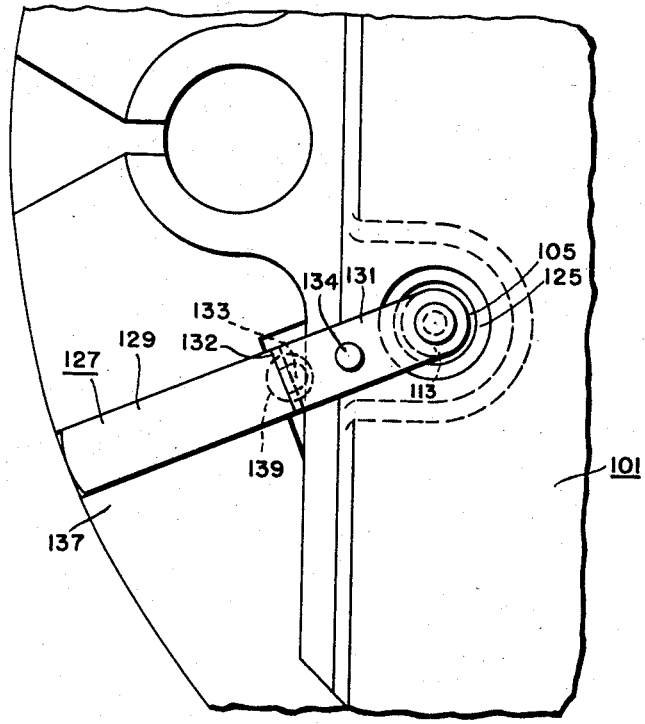
Fig. 9 is a view in bottom plan of the portions of Fig. 8.

Referring now to Figs. 8 and 9, there is illustrated a preferred embodiment of the invention wherein a surge protector includes a ground electrode which is detachably mounted to a meter supporting plate by a different arrangement than that previously described.

As illustrated in Figs. 8 and 9, the meter structure includes a base plate 101 which constitutes a portion of the cover receptacle of the meter structure and which is of different construction than the base plate 5. The base plate 101 has a surface 103 which is exposed when the cooperating cover and socket receptacles of the meter structure are detached from each other. As shown in Fig. 8, the base plate 101 is provided with a cavity 105 which extends from the surface 103 thereof toward the surface 107 thereof. A suitable passage 109 of the base plate communicates with the cavity 105 and extends to the surface 107 of the base plate.

In order to protect the meter windings against electrical surges a surge protector in the form of a discharge device 110 is provided. As shown in Fig. 8, the device 110 includes a pair of electrodes 111 and 113 positioned within the cavity 105 in spaced relation to define a discharge gap 115 which is adapted to break down when the voltage applied thereto exceeds a predetermined value.

For the purpose of electrically connecting one of the electrodes, such as the electrode 111, to one of the meter windings, a terminal strip 117 is provided. The strip 117 may be constructed of any suitable electro-conductive material and is illustrated as being connected to the windings to be protected through a suitable lead 36. If the lead 36 is a rigid bare conductor the strip 117 may be of resilient construction and may be biased into engagement with the lead 36. If the lead 36 is of flexible construction the strip 117 may be connected thereto in any suitable manner, such as by winding the lead about the strip 117 to provide a rigid connection.

The strip 117 is provided with an opening 119 and may be electrically connected to the electrode 111 by any suitable electroconductive connecting means. Conveniently, such connecting means may also serve to secure both the electrode 111 and the strip 117 in operative positions relative to the base plate 101. To this end the electrode 111 may be provided with a stem 121 proportioned to extend through the opening 109 of the base plate and the opening 119 of the strip 117 when the strip 117 and electrode 111 are in operative positions. The end of the stem 121 may then be deformed as indicated by the reference numeral 123 to effectively secure the strip 117 and the electrode 111 to the base plate 101.

It is noticed with reference to Fig. 8 that the discharge gap 115 defined by the electrodes 111 and 113 is effectively sealed from the interior of the cover receptacle by means of the stem 121 of the electrode 111 and portions of the base plate 101. In order to protect the base plate 101 from the effects of discharge arcs a liner 125, which may be similar to the liner 97, is positioned within the cavity 105 to surround the discharge gap 115.

In order to secure the electrode 113 relative to the meter structure to permit ready installation and removal thereof, means are provided in accordance with the invention for detachably mounting the electrode 113 on the surface 103 of the base plate.

As illustrated in Fig. 8, the electrode 113 is carried by a strip 127 which may be constructed of the same material employed in the strip 61. The strip 127 is provided with ends 129 and 131 connected by an intermediate portion 132. When in an untensioned condition the strip 127 is of substantially Z-shaped configuration. It is observed with reference to Fig. 8 that the ends 129 and 131 of the strip 127 define a pair of substantially parallel spaced planes. The strip 127 is provided with a tab 133 comprising a portion of the strip which is struck therefrom and which lies substantially in the plane of the end portion 129. The electrode 113 may be secured to the end 131 of the strip in any desired manner.

In order to permit proper positioning of the electrode 113 relative to the electrode 111, the base plate 101 is provided with a projection 134 extending from the surface 103 thereof. The projection 134 is adapted to be received in an opening 135 of the strip for locating and maintaining the electrode 113 in the proper position within the cavity 105.

The base plate 101 is provided with a flange 137 having an opening 139 which communicates with a channel 141 of the flange 137. The tab 133 of the strip 127 is proportioned to engage a shoulder 143 of the base plate 101 when the strip 127 is in an operative position. The base plate 101 is provided with a surface 145 which extends transversely of the shoulder 143 and against which the portion 132 of the strip bears when the strip is in an operative position.

In order to mount the electrode 113 in an operative position the strip 127 is initially positioned to have the projection 134 of the base plate extend into the opening 135 of the strip and to have the electrode 113 project into the cavity 105 of the base plate. The strip may then be adjusted to effect vertical alignment between the end 129 of the strip and the channel 141 of the flange 137. By reason of the resilient construction of the strip the portion 132 thereof is biased into engagement with the surface 145 of the base plate with the result that the tab 133 of the strip is seated upon the shoulder 143. The strip is in a tensioned condition when positioned relative to the base plate 101 in the manner described.

In order to complete the assembly of the electrode 113 relative to the meter structure, the cover and socket receptacles may be placed in the attached position as discussed in connection with Fig. 1 with the result that the flange 24 of the socket receptacle engages the end 129 of the strip to provide a suitable discharge path for electrical surges which includes the socket receptacle of the meter. In addition, the end 129 of the strip is depressed into the channel 141 by the flange 24 to insure against accidental displacement of the electrode 113.

In order to detach the electrode 113 from the base plate the cooperating cover and socket receptacles are separated to expose the surface 103 of the base plate. Pressure is then applied to the end 129 of the strip in the direction of the arrow 147 to effect disengagement of the tab 133 and the shoulder 143. The strip may then be withdrawn from the base plate by effecting removal of the projection 134 from the opening 135 of the strip.

Although the electrode 111 may be mounted in an analogous manner for ready replacement, it can withstand more discharges than the cooperating electrode 113 can withstand. For this reason the electrode 111 is shown riveted to the base plate.

Although the invention has been described with reference to certain specific embodiments thereof, numerous modifications falling within the spirit and scope of the invention are possible.

We claim as our invention:

1. An electrical surge protective device comprising a supporting structure formed of material subject to damage by discharge arcs, said supporting structure having first and second sides with a cavity extending from said first side toward said second side to define with the second side a wall of the structure, a liner for said cavity formed of a heat-resistant electrical insulating material, said liner being slidably mounted within the cavity, a pair of electrodes, and means securing the electrodes to the supporting structure in spaced relation within the cavity to establish a discharge gap surrounded by the liner, said means including a resilient strip member carrying one of said electrodes, and retaining means detachably mounting the strip member to the supporting structure to extend across at least a portion of the open end of the cavity, said strip member supporting said liner to bias the liner into engagement with said wall.

2. An electrical surge protective device comprising a supporting structure, a pair of electrodes, and means securing the electrodes to the supporting structure in spaced relation for establishing a surge discharge gap, said means including a resilient and deformable member having a pair of end portions, one of the end portions carrying one of the electrodes, and retaining means engaging said deformable member intermediate the end portions for detachably mounting the deformable member to the supporting structure with the other of said end portions spaced from the supporting structure, said retaining means being positioned to clear the deformable member for detachment from the supporting structure in response to deformation of the deformable member within the elastic limit thereof.

3. An electrical surge protective device comprising a supporting structure, a pair of electrodes, and means securing the electrodes to the supporting structure in spaced relation for establishing a surge discharge gap, said means including a resilient and deformable member having a pair of end portions, one of the end portions carrying one of the electrodes, and retaining means engaging said deformable member intermediate the end portions for detachably mounting the deformable member to the supporting structure with the other of said end portions spaced from the supporting structure, said retaining means being positioned to clear the deformable member for detachment from the supporting structure in response to deformation of the deformable member within the elastic limit thereof, said deformable member carrying said one of the electrodes for deflection in the direction of flow of discharge gases.

4. An electrical instrument assembly of the detachable type comprising an instrument movement, a cover receptacle housing the instrument movement, said cover receptacle including a base plate supporting the instrument movement, and a protective cover secured to the base plate to surround the movement, a socket receptacle adapted to detachably receive the cover receptacle to define with the base plate an enclosure when the cover and socket receptacles are in the attached position, and an electrical surge protective device electrically connected to the instrument movement for protecting the movement against electrical surges, said device comprising first and second electrodes, first means securing the first electrode to the base plate, and second means detachably mounting the second electrode in spaced relation with the first electrode for establishing a surge discharge gap, said second means comprising a resilient and deformable member carrying the second electrode, and retaining means securing the deformable member to the base plate within the enclosure, said retaining means being positioned to clear the deformable member for detachment from the base plate in response to deformation of the deformable member within the elastic limit thereof, said deformable member being formed of an electroconductive material, said retaining means mounting the deformable member for engagement with the socket receptacle when the cover and socket receptacles are in attached position.

5. An electrical instrument assembly of the detachable type comprising an instrument movement, a cover receptacle housing the movement, said cover receptacle including a base plate supporting the movement and a protective cover secured to the base plate to surround the movement, a socket receptacle adapted to detachably receive the cover receptacle to define with the base plate an enclosure when the cover and socket receptacles are in the attached position, and an electrical surge protective device electrically connected to the movement for protecting the movement against electrical surges, said device comprising first and second electrodes, first means securing the first electrode in an operative position, and second means mounting the second electrode in spaced relation with the first electrode for establishing a surge discharge gap, said second means comprising an electroconductive member having a pair of ends and a central portion with one of the ends supporting the second electrode, and retaining means integral with said base plate positioned within the enclosure for retaining the electroconductive member in an operative position, said retaining means engaging said central portion to position said one of the ends for supporting the second electrode in an operative position, and to position the other of said ends for engagement with the socket receptacle when the cover and socket receptacles are in the attached position, said electroconductive member being of resilient and deformable construction, said retaining means being positioned to clear the electroconductive member for removal from an operative position in response to deformation of the electroconductive member within the elastic limit thereof, said retaining means being further positioned to mount the second electrode for deflection in the direction of flow of discharge gases.

6. An electrical instrument assembly of the detachable type comprising an instrument movement, a cover receptacle housing the instrument movement, said cover receptacle including a base structure formed of electrical insulating material supporting the instrument movement, and a protective cover secured to the base structure to provide a first enclosure for the movement; a socket receptacle formed of an electroconductive material adapted to detachably receive the cover receptacle to define with the base structure a second enclosure when the cover and socket receptacles are in the attached position, said base structure having first and second surfaces positioned, respectively, within said first and second enclosures, said second surface having a cavity, and an electrical surge protective device electrically connected to the instrument movement for protecting the movement against electrical surges, said device comprising first and second electrodes, first electroconductive means securing the first electrode to the base structure within the cavity adjacent said first surface, and second electroconductive means securing the second electrode to the base structure within the cavity adjacent said second surface in spaced relation with the first electrode for establishing a surge discharge gap within the cavity, said second means including a deformable member having a portion positioned to engage the socket receptacle when the cover and socket receptacles are in attached position.

References Cited in the file of this patent

UNITED STATES PATENTS

| | | |
|---|---|---|
| 807,963 | Pickard | Dec. 19, 1905 |
| 1,545,646 | Everett | July 14, 1925 |
| 1,758,181 | Steinmayer | May 13, 1930 |
| 1,930,865 | Statler | Oct. 17, 1933 |
| 2,018,672 | Hill | Oct. 29, 1935 |
| 2,050,334 | Kellogg | Aug. 11, 1936 |
| 2,154,411 | Road | Apr. 11, 1939 |
| 2,163,742 | Wolfskill | June 27, 1939 |
| 2,199,630 | Hodnette | May 7, 1940 |
| 2,242,838 | Somes | May 20, 1941 |
| 2,290,304 | Waterman | July 21, 1942 |